Figure 1:
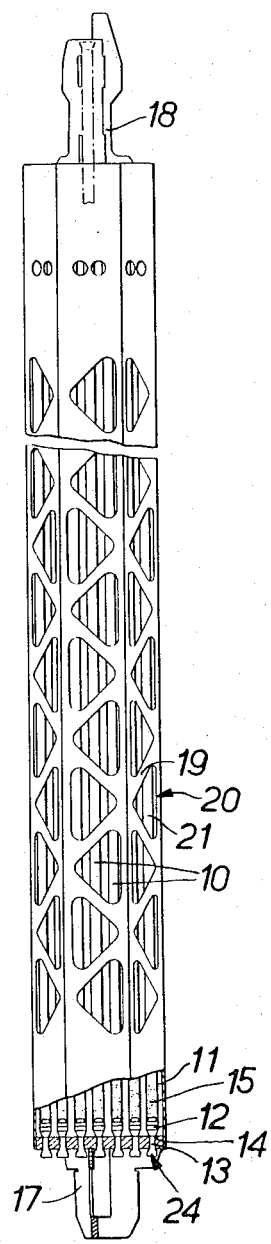

Feb. 7, 1967  C. JOHNSTON  3,303,099

NUCLEAR FUEL ASSEMBLY

Filed May 22, 1964  2 Sheets-Sheet 1

Feb. 7, 1967      C. JOHNSTON      3,303,099
NUCLEAR FUEL ASSEMBLY
Filed May 22, 1964                  2 Sheets-Sheet 2
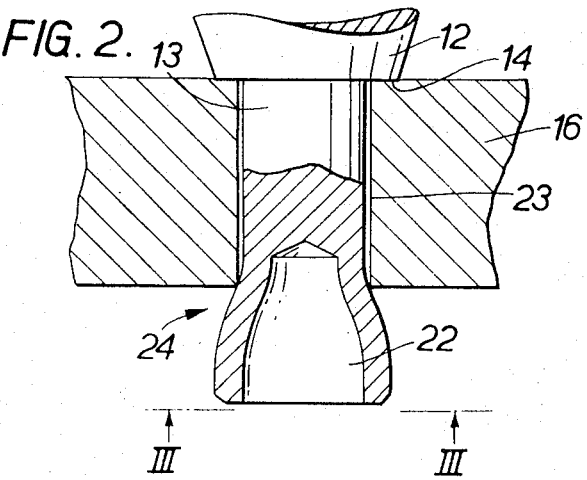
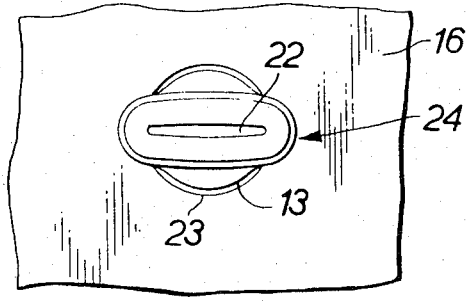
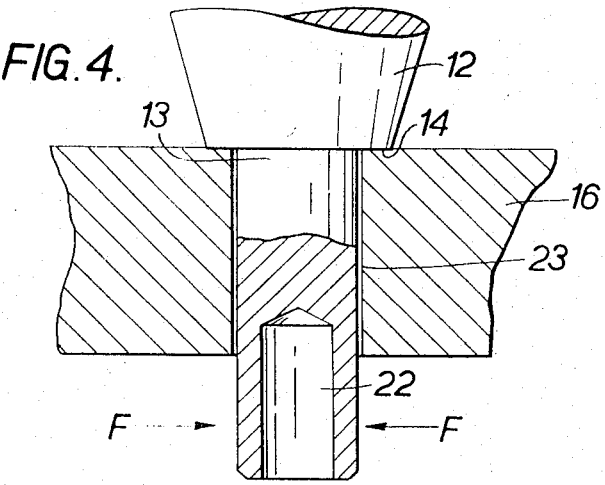

United States Patent Office 3,303,099
Patented Feb. 7, 1967

3,303,099
NUCLEAR FUEL ASSEMBLY
Charles Johnston, Wrea Green, Preston, England, assignor to Societe Anglo-Belge Vulcain S.A., Brussels, Belgium
Filed May 22, 1964, Ser. No. 369,367
Claims priority, application Great Britain, June 5, 1963, 22,464/63
1 Claim. (Cl. 176—78)

This invention relates to a nuclear fuel assembly of the kind in which a plurality of fuel pins are supported in a bundle with their longitudinal axes parallel. The invention is more particularly related to the means employed for securing one end of each fuel pin to a support plate.

Accordingly the present invention provides a nuclear fuel assembly comprising a plurality of fuel pins supported in a bundle with their longitudinal axes parallel and a support plate to which the fuel pins are secured wherein means to secure each fuel pin to the support plate comprise a peg projecting axially from one end of said pin, the peg being formed with a hollow end portion, a shoulder between the peg and the pin, a hole in the support plate penetrated by the peg to an extent limited by the shoulder, and a pinched deformation of the hollow portion of the peg which engages the support plate on the side remote from the shoulder. Preferably the deformation extends into the hole in the support plate to an extent determined by the axial length of the hollow portion of the peg.

The invention also embraces in the manufacture of a nuclear fuel assembly in which a plurality of fuel pins are supported in a bundle with their longitudinal axes parallel, the pins having axially projecting pegs which are secured into a support plate, a method for securing each fuel pin to the support plate comprising forming a hollow end portion in the peg projecting from said pin, entering the peg into a hole in the support plate to an extent limited by a shoulder between the peg and the pin, and pinching the hollow portion of the peg on the side remote from the shoulder to form a deformation which engages the support plate.

One construction of nuclear fuel assembly embodying the invention will now be described by way of example with reference to the accompanying drawings in which:
FIGURE 1 is a general view of the fuel assembly with the bottom end of the assembly shown in section,
FIGURE 2 is an enlarged view of a detail of FIGURE 1,
FIGURE 3 is an end view on line III—III of FIGURE 2, and
FIGURE 4 is a view similar to that of FIGURE 2 showing a fuel pin located in a support plate but not secured thereto.

The nuclear fuel assembly now to be described incorporates 37 fuel pins 10 which are supported in a bundle with their longitudinal axes parallel. These fuel pins comprise elongate tubular sheaths 11 which contain pellets of fissile material such as $UO_2$. The fuel pins are closed at each end and in their upper ends they house springs (not shown) by which the fissile pellets are restrained from axial movement. At their lower ends, the fuel pins are closed by plugs 12 which are formed with pegs 13 of reduced diameter (5 mm.) with respect to the pins. A shoulder 14 is formed between the peg and the plug by which each pin is closed. Between the bottom plug 12 and the fissible pellets (not shown), the tubular sheath 11 of each fuel pin is packed with heat insulant 15.

The fuel pins are secured at the lower ends to a bottom support plate 16 which is an integral casting with a bottom fitting 17 by which the assembly can be located in a nuclear reactor. At their upper ends the fuel pins are located by a top support plate (not shown) which is integral with a top fitting 18. Between the support plates the fuel pins are housed in a hexagonal shroud 19 which is formed with triangular apertures 20 to permit flow of coolant water through the shroud. Within the shroud the relative spacing of the fuel pins is maintained by spacer grids 21.

The means by which each fuel pin is secured to the support plate 16 is illustrated in FIGURES 2 and 3. As shown the peg is formed with a cavity 22 defining a hollow end portion. The peg is entered into a hole 23 in the plate 16 and penetrates the hole to an extent limited by engagement between the shoulder 14 and the top surface of the support plate 16. Below the support plate, the peg is pinched to produce a deformation 24 which engages the bottom surface of the support plate. It will be noticed that the deformation 24 extends into the hole 23 in the support plate; the extent of this deformation into the hole is determined by the axial length of the hollow portion of the peg and therefore by the axial length of the cavity 22.

During manufacture of the fuel assembly, it is arranged that the pegs 13 on the plugs 12 are formed with an axial length of 16 mm. and that the cavities 22 are bored into the pegs to an axial depth of 7.75 mm. Each fuel pin is located in the support plate by entering its peg 13 into a hole 23 in the support plate (FIGURE 4). A pinching force is now temporarily applied in the direction of the arrows F to cause deformation of the hollow portion of the peg with the result that the pin is secured to the support plate (as shown in FIGURES 2 and 3).

The purpose of the cavity 22 bored into each plug at the lower end of each fuel pin is firstly to reduce the pinching force required to deform the end portion of the peg and secondly to determine the axial length of the deformation 24 formed thereby.

It will be appreciated that the present invention provides a nuclear fuel assembly in which the fuel pins are secured to a support plate by means which are simply and rapidly effected.

I claim:

In a nuclear fuel assembly comprising a plurality of fuel pins supported in a bundle with their longitudinal axes parallel and a support plate to which the fuel pins are secured, means to secure each fuel pin to the support plate comprising a peg projecting axially from one end of said pin and being formed with a hollow end portion, a shoulder between the peg and the fuel pin, a hole in the support plate, at least a portion of the peg extending completely through the hole in the support plate to an extent limited by the shoulder, and a pinched deformation of the hollow portion of the peg which engages the support plate on the side thereof remote from the shoulder, the deformation being such that two points at opposite ends of a diameter of the peg at the hollow end thereof are urged towards each other by a force acting substantially perpendicular to the axis of the peg, and the axial extent of the deformation inwardly from the hollow end of the peg being determined by the axial length of the hollow portion of the peg.

References Cited by the Examiner

UNITED STATES PATENTS

| | | | | |
|---|---|---|---|---|
| 1,656,856 | 1/1928 | Gagnon | 287—20.3 | X |
| 1,702,158 | 2/1929 | Gagnon | 287—20.3 | X |
| 3,015,616 | 1/1962 | Sturtz et al. | 176—78 | |

FOREIGN PATENTS 425,879  5/1964  Germany.

CARL D. QUARFORTH, *Primary Examiner.*

BENJAMIN R. PADGETT, LEON D. ROSDOL,
*Examiners.*

M. J. SCOLNICK, *Assistant Examiner.*